United States Patent [19]
Yokonuma et al.

[11] Patent Number: 5,805,206
[45] Date of Patent: Sep. 8, 1998

[54] FILM IMAGE PROCESSING APPARATUS

[75] Inventors: Norikazu Yokonuma, Yokohama; Kazuyuki Kazami, Tokyo; Hideo Hibino, Kawasaki; Hisashi Okutsu, Yokohama, all of Japan

[73] Assignee: Nikon Corporation, Tokyo, Japan

[21] Appl. No.: 666,075

[22] Filed: Jun. 19, 1996

[30] Foreign Application Priority Data

Jun. 19, 1995 [JP] Japan .................................. 7-151717
Jun. 19, 1995 [JP] Japan .................................. 7-151718

[51] Int. Cl.⁶ ............................................... H04N 7/18
[52] U.S. Cl. ........................ 348/96; 358/302; 358/528
[58] Field of Search ................................ 348/96, 97, 98, 348/358; 358/302, 528; 386/121

[56] References Cited

U.S. PATENT DOCUMENTS

| | | | |
|---|---|---|---|
| 4,028,733 | 6/1977 | Ulicki | 386/121 |
| 4,482,924 | 11/1984 | Brownstein | 358/302 |
| 4,485,406 | 11/1984 | Brownstein | 348/97 |
| 4,506,300 | 3/1985 | Fearnside | 348/110 |
| 4,642,700 | 2/1987 | Ohta | 358/528 |
| 4,809,064 | 2/1989 | Amos | 358/528 |
| 4,924,302 | 5/1990 | Shiota | 358/528 |
| 4,974,096 | 11/1990 | Wash | 358/302 |
| 5,068,739 | 11/1991 | Filo | 348/96 |
| 5,345,286 | 9/1994 | Stiehler | 396/397 |
| 5,469,209 | 11/1995 | Gunday et al. | 348/96 |

*Primary Examiner*—Howard Britton
*Attorney, Agent, or Firm*—Oliff & Berridge, PLC

[57] ABSTRACT

A film image processing apparatus that is capable of displaying a correct screen image at all times by taking into consideration aspect ratios of a print and the monitor screen is provided. In order to achieve this, the film image processing apparatus comprises a CCD that picks up a photographic image formed on developed film, a screen image signal output circuit that outputs a screen image signal so that an image thus picked up can be displayed as a screen image on a monitor screen, a zoom lens that changes the magnification of a screen image to be displayed on the monitor screen, a read magnetic head that reads information related to the aspect ratio of a print when a photographic image is printed and a control circuit that controls the zoom lens to change the magnification of the screen image of the photographic frame in correspondence to the aspect ratio of the print that has been read.

37 Claims, 15 Drawing Sheets

FILM IMAGE PROCESSING APPARATUS

BACKGROUND OF THE INVENTION

1. Field of the Invention

The present invention relates to a film image processing apparatus with which photographic images on developed film can be viewed on a monitor screen.

2. Description of the Related Art

In U.S. Pat. Nos. 4,482,924, 4,485,406 and 4,506,300, apparatuses that pick up images on developed film with a CCD or the like and display the picked-up images on a TV screen or the like as screen images are disclosed. By using this type of apparatus, photographic images on individual frames can be viewed as screen images so that it can be decided whether or not they are to be printed.

Prints can be produced in a plurality of types of prints, i.e., normal, wide, panorama or the like, and each print format has its own aspect ratio. In addition, the aspect ratio of the TV screen on which screen images of photographic images are displayed varies depending upon its type, i.e., regular television, wide television or the like. Therefore, a desired screen image cannot be achieved merely by outputting screen images in the same way under all circumstances, disregarding the print format and the television type.

With this type of apparatus, text information related to a photographic image (photographing date, and the like) may be displayed superimposed as the corresponding screen image is displayed on a TV screen. However, unless the display position of the text information is set while taking into consideration the aspect ratio and the magnification of the screen image or the television size, the information and the screen image may become difficult to see.

SUMMARY OF THE INVENTION

A first object of the present invention is to provide a film image processing apparatus with which it is possible to display an appropriate screen image at all times by taking into consideration the aspect ratios of the print and the monitor screen.

A second object of the present invention is to provide a film image processing apparatus with which it is possible to display information at the optimal position at all times by taking into consideration the aspect ratios of the print and the monitor screen or the magnification of the screen image.

In order to achieve the objects described above, the film image processing apparatus according to the present invention comprises an image pickup device that picks up photographic images formed on developed film, a screen image signal output circuit, which is electrically connected with the image pickup device, that outputs screen image signals so that a picked-up image can be displayed on a monitor screen as a screen image, a magnification changing device, which is electrically connected with the screen image signal output circuit, that changes the magnification of a screen image for display on the monitor screen, a print information input device that inputs information related to the aspect ratio of the print with which a photographic image has been printed and a control circuit, which is electrically connected with the magnification changing device and print information input device, that controls the magnification changing device so that the magnification of the screen image of a photographic image is changed in correspondence to the print aspect ratio that has been input.

According to the present invention, since the magnification of the screen image of a photographic image is changed in correspondence to the print aspect ratio that has been input, a screen image can be displayed over a correct range at all times. In particular, by driving a zooming optical system to change the magnification, the quality of the image will not be reduced.

In another mode according to the present invention, the film image processing apparatus comprises the image pickup device, the screen image signal output circuit, the magnification changing device and the print information input device, all of which have been described above, a monitor information input device that inputs information related to the aspect ratio of the monitor screen and a control circuit, which is electrically connected with the magnification changing device, the print information input device and the monitor information input device, that controls the magnification changing device so that the magnification of the screen image is changed in correspondence to the aspect ratio of the print and the aspect ratio of the monitor screen that have been input.

According to the present invention, since the magnification of a screen image is changed in correspondence to the aspect ratio of the print and the aspect ratio of the monitor screen that have been input, a screen image can be displayed over a correct range at all times. In particular, by driving the zooming optical system to change the magnification, the quality of the image will not be reduced.

In yet another mode according to the present invention, the film image processing apparatus comprises the image pickup device, the screen image signal output circuit and the magnification changing device, all of which have been described above, a monitor information input device that inputs information related to the aspect ratio of the monitor screen and a control circuit, which is electrically connected with the magnification changing device and the monitor information input device, that controls the magnification changing device so that the magnification of a screen image is changed in correspondence to the aspect ratio of the monitor screen that has been input.

According to the present invention, since the magnification of a screen image signal is changed in correspondence to the aspect ratio of the monitor screen that has been input, the screen image can be displayed over a correct range at all times. In particular by driving the zooming optical system to change the magnification, the quality of the image will not be reduced.

In yet another mode according to the present invention, the film image processing apparatus comprises the image pickup device and the screen image signal output circuit, both of which have been described above, a mask circuit, which is electrically connected with the screen image signal output circuit, that processes a screen image in such a manner that the screen image of a photographic image is displayed with a portion of it masked, a print information input device that inputs information related to the aspect ratio of a print with which a photographic image has been printed and a control circuit, which is electrically connected with the mask circuit and the print information input device, that controls the mask circuit to ensure that the masked portion of a screen image is changed in correspondence to the print aspect ratio that has been input.

According to the present invention, since the masked portion of a screen image is changed in correspondence to the print aspect ratio that has been input, the screen image can be displayed at a correct aspect ratio at all times.

In yet another mode according to the present invention, the film image processing apparatus comprises the image pickup device, the screen image signal output circuit and the mask circuit, all of which have been described above, a monitor information input device that inputs information related to the aspect ratio of the monitor screen and a control circuit, which is electrically connected with the mask circuit and the monitor information input device, that controls the mask circuit to ensure that the masked portion of a screen image is changed in correspondence to the aspect ratio of the monitor screen that has been input.

According to the present invention, since the masked portion of the screen image is changed in correspondence to the aspect ratio of the monitor screen that has been input, the screen image can be displayed at the correct aspect ratio at all times.

In yet another mode according to the present invention, the film image processing apparatus comprises the image pickup device and the screen image signal output circuit, both of which have been described above, a magnification changing device, which is electrically connected with the screen image signal output circuit, that changes the magnification of the screen image being displayed on the monitor screen, a control circuit, which is electrically connected with the magnification changing device, that controls the magnification changing device so that the magnification of the screen image is changed in response to a magnification change command, a command device, which is electrically connected with the monitor screen, that outputs a screen image change command for displaying the screen image of a photographic image in a frame other than the frame to which the screen image currently displayed on the monitor screen belongs and an initial setting circuit, which is electrically connected with the monitor screen, that outputs a magnification change command for resetting the magnification of the screen image to the initial magnification when the film image was first picked up in response to a screen image change command.

According to the present invention, since, while the magnification of the screen image being displayed on the monitor screen is changed in response to the magnification change command, the magnification of the screen image is automatically reset to the initial magnification when a screen image change command is output, new screen images are not displayed magnified or reduced. This prevents the user from mistaking a screen image that is magnified or reduced for the original screen image. In addition, since it is not necessary for the user to initialize the magnification each time the screen image changes, the ease of use improves.

In yet another mode according to the present invention, the film image processing apparatus comprises the image pickup device and the screen image signal output circuit, both of which have been described above, a magnification changing device, which is electrically connected with the screen image signal output circuit, that changes the magnification of a screen image that is being displayed on the monitor screen and a control circuit, which is electrically connected with the magnification changing device, that masks a portion of a screen image to ensure that the screen image of a photographic image is displayed in a specific screen image area within the monitor screen and changes the size of the masked area when the magnification of the screen image is changed subsequently by the magnification changing device in such a manner that the screen image area is increased or decreased in correspondence to the change in the magnification.

According to the present invention, since a portion of a screen image signal is masked to ensure that the screen image of a photographic image is displayed in a specific screen image area within the monitor screen, and when the magnification of the screen image is subsequently changed, the size of the masked portion is changed so that the screen image area will be increased or decreased in correspondence to the change in magnification, problems such as a portion of the screen image being cut off in an undesirable manner or an unnecessary portion being displayed can be eliminated even when the magnification changes.

In yet another mode according to the present invention, the film image processing apparatus comprises an image pickup device that picks up photographic images formed on developed film, a screen image signal output circuit, which is electrically connected with the image pickup device, that outputs screen image signals so that a picked-up image can be displayed on a monitor screen as a screen image, a display signal output circuit that outputs display signals to display information related to the photographic image for which a screen image signal is being output on the monitor screen, an information input device that input information related to the ratio of space occupied by the screen image within the monitor screen and a control circuit, which is electrically connected with the signal output circuit and the information input device, that controls the display signal output circuit so that the display position of the information to be displayed is changed in correspondence to information input from the information input device.

According to the present invention, since the display position of the information is changed in correspondence to the information related to the ratio of space occupied by the screen image within the monitor screen (the aspect ratio of the print or the aspect ratio of the monitor screen, for instance), the information can be displayed at the optimal position at all times.

DESCRIPTION OF THE PREFERRED EMBODIMENTS

An embodiment of the present invention is explained in reference to FIGS. 1–15.

Figure 1:
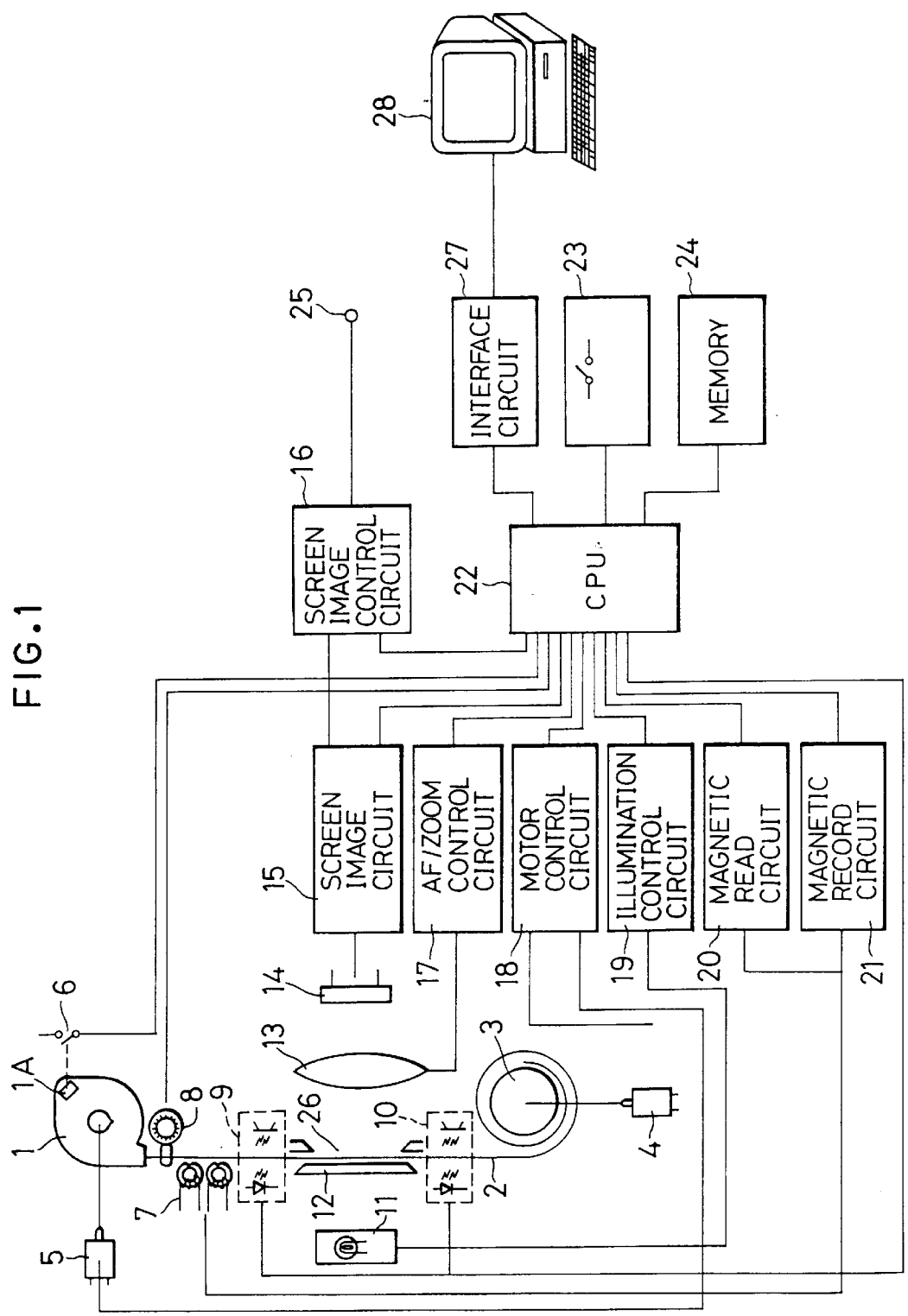
FIG. 1 is a block diagram of the entire structure of the film image processing apparatus in an embodiment according to the present invention.

FIG. 1 shows the overall structure of the film image processing apparatus according to the present invention. Reference number 1 is a film cartridge loaded in this apparatus, which is internally provided with a spool shaft around which film 2 is wound. The film 2 is provided with a magnetic recording area below each photographic frame for recording photographic information related to the associated frame. Film that has been photographed using a camera (not shown) is taken to a laboratory and is developed. Then, it is replaced in the cartridge and returned to the user. On the upper surface of the cartridge 1, an indicator mechanism 1A is provided, which, by its position, indicates whether or not the film inside has been developed.

Reference number 3 indicates a windup spool for winding up film that has been drawn out from the cartridge 1, reference number 4 indicates a windup motor that causes the windup spool to rotate and reference number 5 indicates a delivery/rewind motor that delivers film from the cartridge and rewinds the film into the cartridge by causing the spool shaft of the cartridge 1 to rotate. These motors 4 and 5 are connected to a CPU 22 via a motor control circuit 18. Reference number 6 indicates a status detection switch that is turned on or off in correspondence to the position of the indicator mechanism 1A of the cartridge 1, and it is turned on when the indicator mechanism 1A indicates that the film has been developed and is turned off when the indicator mechanism 1A indicates that the film has not been developed. The on/off state of the status detection switch 6 is input to the CPU 22.

Reference number 7 indicates a magnetic head that reads information that has been magnetically recorded in the magnetic recording areas provided on the film 2 and magnetically records information in the magnetic recording areas. A signal read by the magnetic head 7 is amplified and decoded at a magnetic read circuit 20 and is then input to the CPU 22. When performing magnetic recording, the CPU 22 drives the magnetic head 7 via a magnetic record circuit 21. Reference number 8 indicates a film encoder that measures the speed at which the film moves and the traveled distance of the film during film feed. Reference numbers 9 and 10 indicate photointerrupters that detect perforations formed in the film, and their detection outputs are input to the CPU 22. Note that the film 2 is provided with one perforation at either end of the exposure area of each photographic frame, as in the case of the film disclosed in U.S. Pat. No. 5,345,286.

Reference number 11 is an illuminating light source that illuminates the film, and reference number 12 indicates a diffusion plate that diffuses the light from the illuminating light source after converting it to milky white color and also functions as a pressing plate for defining the position of the film in the direction of its thickness. Of the light that has been transmitted through the diffusion plate 12 and the film 2, only the light that passes through an opening 26 is transmitted through to an image pickup lens 13 and this image is picked up on a CCD 14. Accordingly, the photographic image formed on the film 2 is projected on the CCD 14. An area IA in FIG. 3A indicates the area of the film that is projected onto the CCD (hereafter referred to as the image area) and the aspect ratio of the image area IA, at 3:4, is the same as the aspect ratio of the opening 26.

Figure 2:
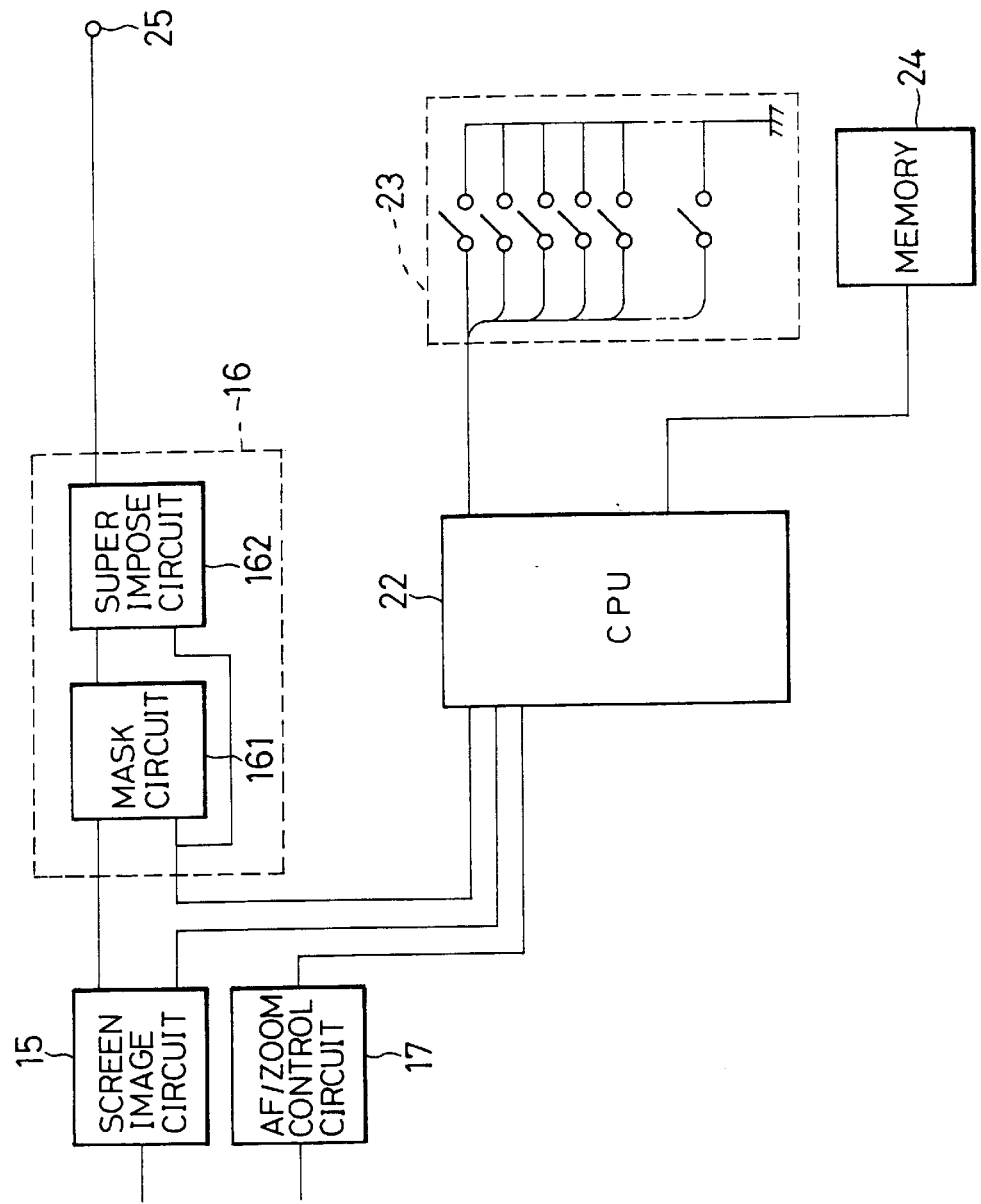
FIG. 2 shows details of a portion of FIG. 1.

Reference number 15 is an image pickup circuit that converts a signal read by the CCD 14 to a video signal and reference number 16 is a screen image control circuit that generates a desired display screen image signal by processing the video signal. As shown in FIG. 2, the screen image control circuit 16 is provided with a mask circuit 161 that masks a portion of a video signal input from the image pickup circuit 15 and a superimpose circuit 162 that adds a character string and the like to the masked video signal output from the mask circuit 161. The position and the width of the portion masked by the mask circuit 161 vary depending upon the TV screen size and the print size, as will be explained later, and the screen image of masked portions are displayed as black bands on the screen.

Figure 3D:
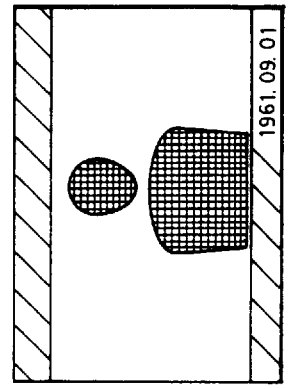
FIGS. 3A–3D show examples of video signals.
Figure 3A:
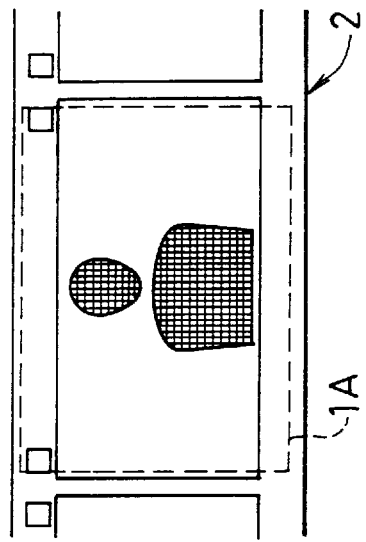
Figure 3C:
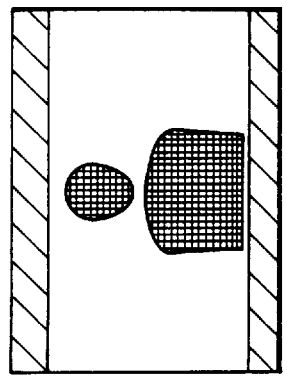
Figure 3B:
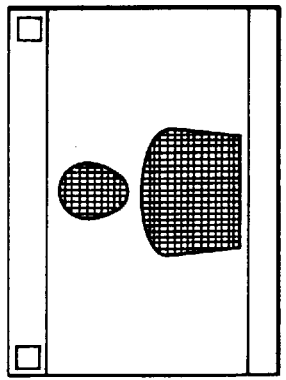
Figure 4:
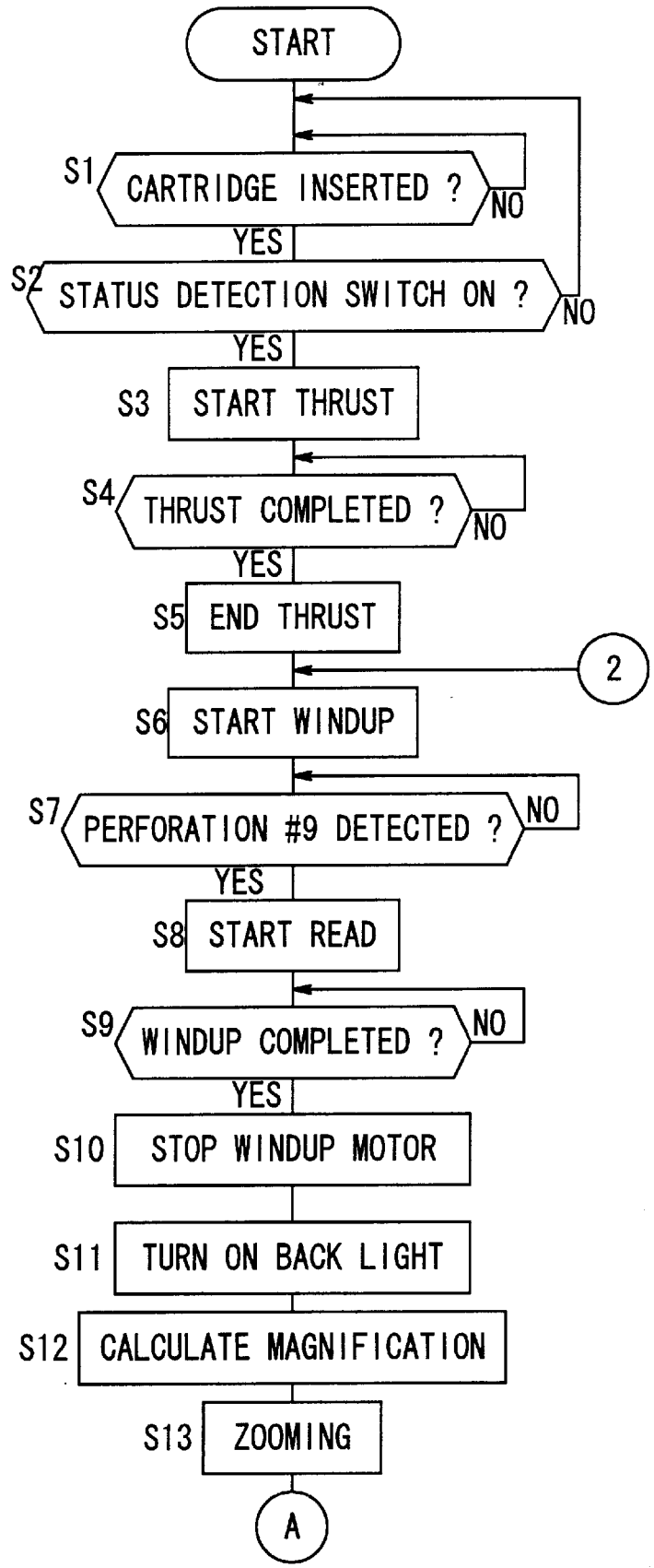
FIG. 4 is a flowchart illustrating the operation of the film image processing apparatus.
Figure 5:
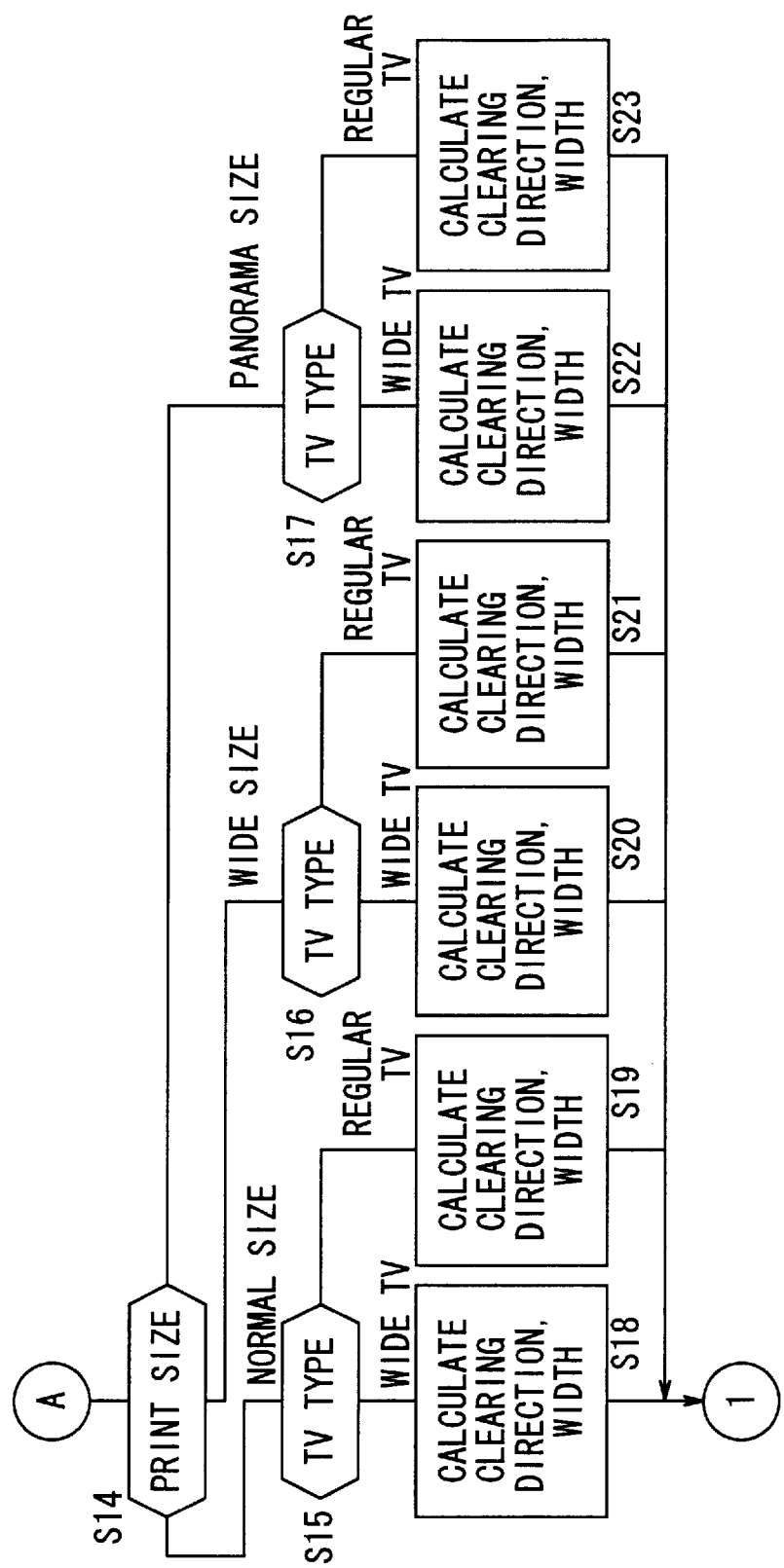
FIG. 5 is a flowchart continuing from FIG. 4.
Figure 6:
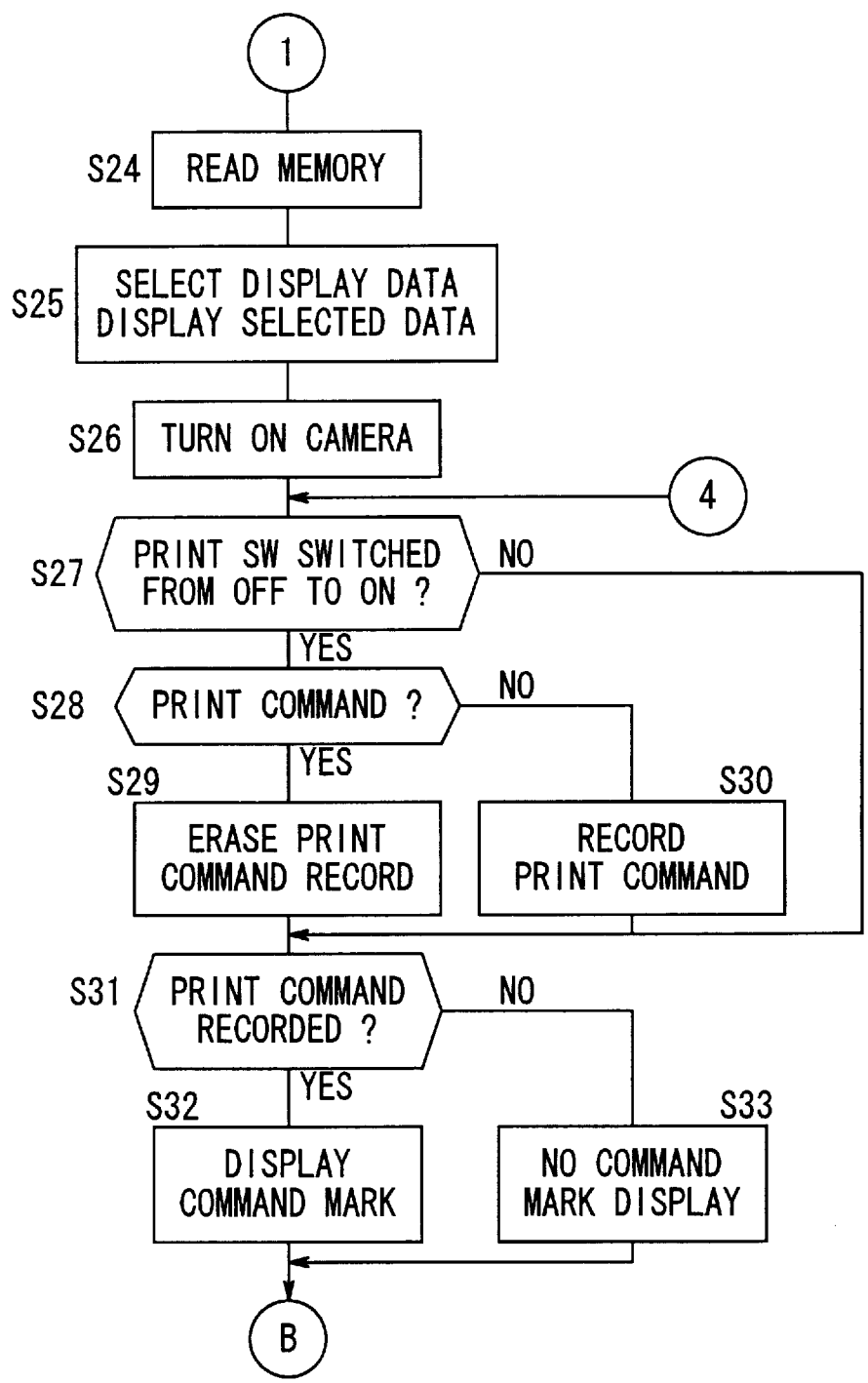
FIG. 6 is a flowchart continuing from FIG. 5.
Figure 7:
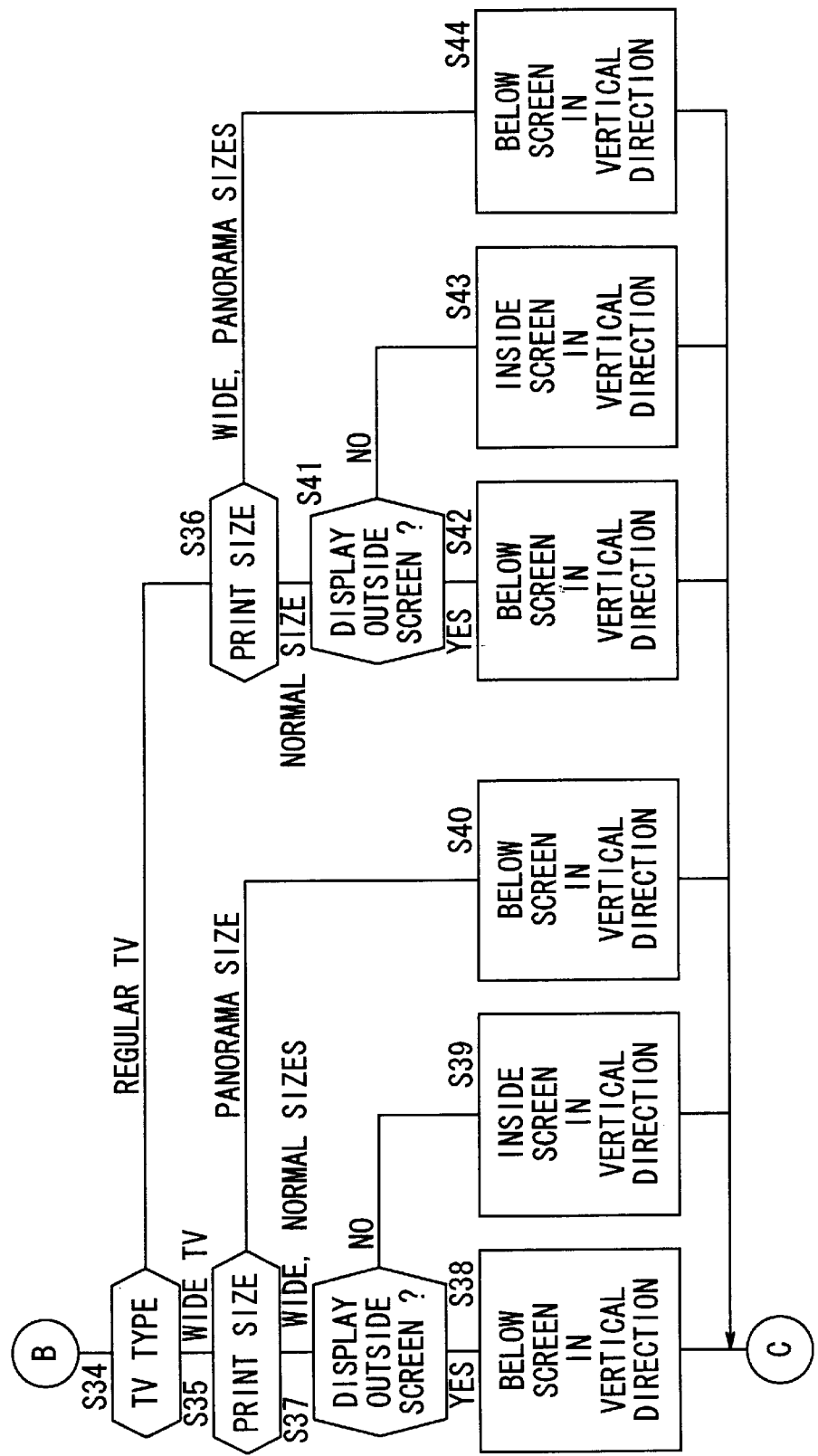
FIG. 7 is a flowchart continuing from FIG. 6.
Figure 8:
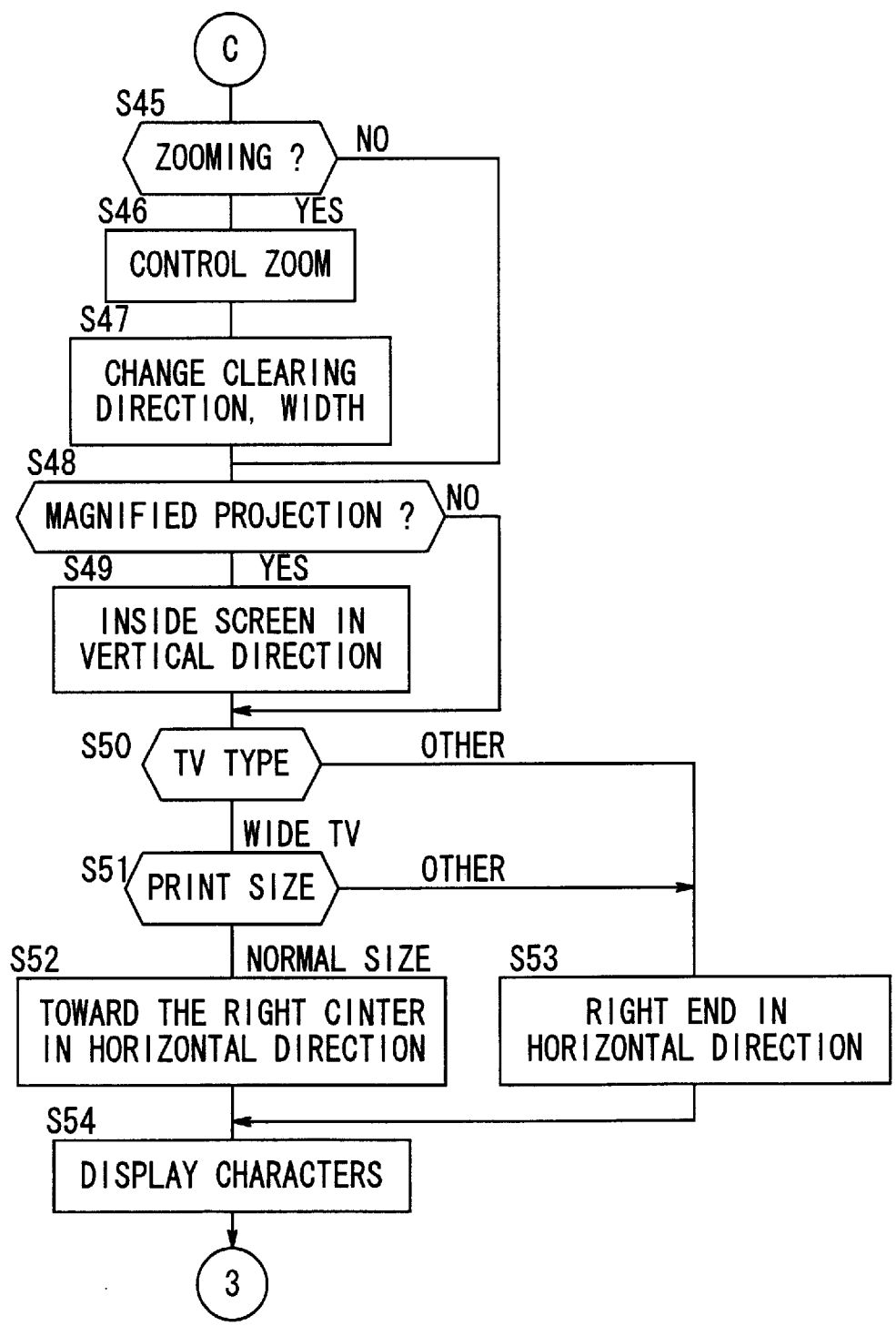
FIG. 8 is a flowchart continuing from FIG. 7.
Figure 9:
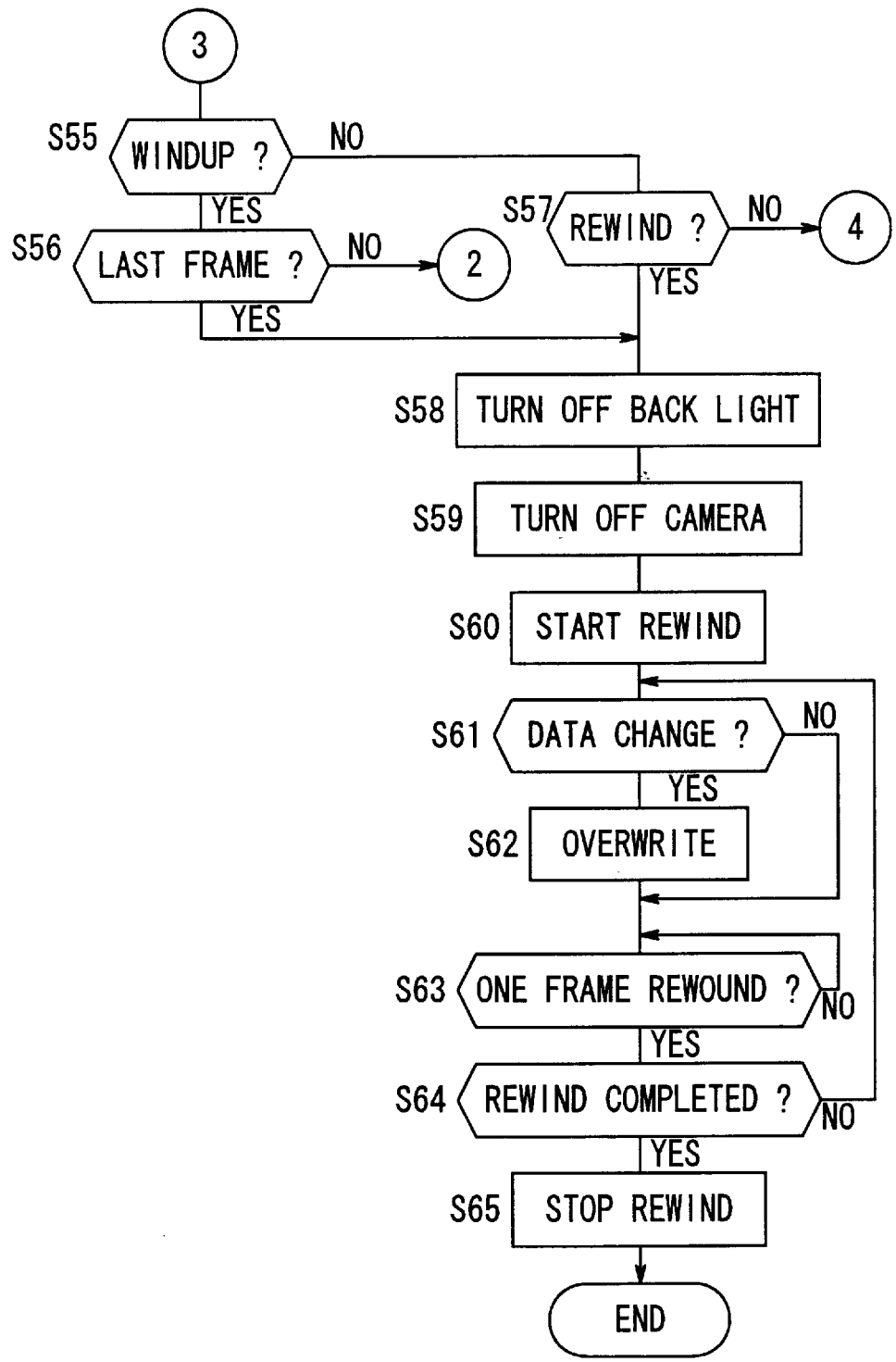
FIG. 9 is a flowchart continuing from FIG. 8.
Figure 10:
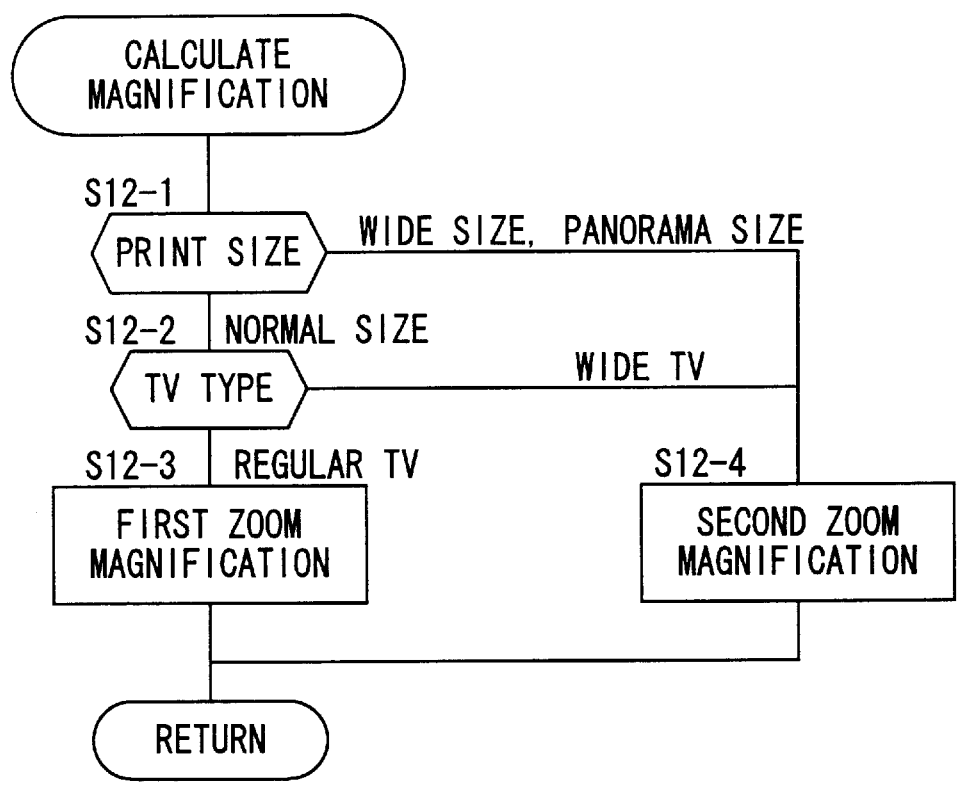
FIG. 10 is a flowchart showing details of magnification setting processing.

A display screen image signal generated at the screen image control circuit 16 is transferred to a television or a video deck (not shown) via a video signal output terminal 25. FIGS. 3B–3D each show a screen image of a video signal, with FIG. 3B corresponding to a video signal output from the screen image pick up circuit 15, FIG. 3C corresponding to a video signal that has been masked by the mask circuit 161 and FIG. 3D corresponding to a video signal to which a character string has been added by the superimpose circuit 162.

Reference number 17 indicates an AF/zoom control circuit that performs focusing adjustment by driving the image pickup lens 13 in the direction of its optical axis and performs zooming for the image pickup area, reference number 19 indicates an illumination control circuit that performs ON/OFF control for the illuminating light source and both of these circuits operate by commands from the CPU 22. In addition, an operating switch group 23 constituted of a plurality of operating switches (also shown in FIG. 2), a memory 24 for storing in memory information or the like read by the magnetic head 7 and an interface circuit 27 for connecting this apparatus to a personal computer 28 are connected to the CPU 22. The personal computer 28 is used for inputting information that is to be displayed together with a screen image on the TV screen (information that is not recorded in the magnetic recording area on the film).

The operating switch group 23 includes a TV-type switch for setting the type of the television to which the apparatus is connected, a print command switch for issuing a command for printing individual photographic frames, a windup switch for winding up the film 2 one frame at a time, a rewind switch for rewinding the film, a off-image display switch for displaying information in such a manner that the information is not superimposed on the screen image of a photographic image and a zoom switch for performing zoom driving of the image pickup lens 13. In this embodiment, the TV-type switch can select between a regular television with an aspect ratio of 3:4 and a wide television with an aspect ratio of 9:16.

In reference to the flowchart in FIGS. 4–10, the procedure of the control performed by the CPU 22 is explained.

The program shown in FIGS. 4–9 is started up when the power is turned on in a state in which the video signal output terminal 25 and a video signal input terminal of the television (not shown) are connected with each other via a cable. In step S1, a load detection switch (not shown) detects whether or not a film cartridge 1 has been loaded in the film image processing apparatus and if a cartridge 1 is loaded, the operation proceeds to step S2. In step S2, a decision is made as to whether the status detection switch 6 is on or off, and if it is off, i.e., if the film inside the cartridge 1 has not been developed, the operation returns to step S1, whereas, if it is on, i.e., if the film has been developed, the operation proceeds to step S3.

In step S3, the delivery/rewind motor 5 is caused to rotate in the direction of film delivery via the motor control circuit 18 and the film 2 is delivered from the cartridge 1. The film 2 thus delivered is guided to the windup spool 3 by traveling through the area immediately rearward of the opening 26 and, with the movement of the film at this time, the film encoder 8 rotates. In step S4, based upon the output from the film encoder 8, the quantity of film delivery is detected and a decision is made as to whether or not the leading end of the film 2 has reached the windup spool 3. If an affirmative decision is made in step S4, the delivery/rewind motor 5 is stopped by the motor control circuit 18 in step S5.

In step S6, the windup motor 4 is driven via the motor control circuit 18 in order to position a specific photographic frame at the opening 26 and, by rotating the windup spool 3 in the direction of windup, the film 2 is wound up. In step S7, the operation waits for one of the photointerrupters, i.e. the photointerrupter 9, to detect a perforation in the film 2 and, upon such detection, the operation proceeds to step S8. The photographic frame to be positioned starts to enter the opening 26 immediately after the perforation is detected by the photointerrupter 9.

In step S8, the magnetic head 7 is driven via the magnetic read circuit 20 and reading of the magnetic information related to the photographic frame to be positioned from the magnetic recording area of the corresponding photographic frame starts. Such magnetic information, which has been recorded by the camera (not shown) during photographing, includes, for instance, the angle of view of photographing or the aspect ratio at the time of printing (print size), the photographing date, the photographing time, the film sensitivity, the shutter speed, the aperture value, the focal length of the taking lens, the camera type or the like. The magnetic read circuit 20 reads the magnetic signal sent from the magnetic head 7, converts it to magnetic information and inputs it to the CPU 22. The magnetic information thus input is stored in memory in the memory 24. Note that the aspect ratio of photographic images formed on the film remains constant regardless of the print size.

In step S9, the operation waits for the other photointerrupter 10 to detect a perforation in the film 2 and upon such detection, it is decided that windup has been completed. Then, the magnetic read circuit 20 is stopped before the operation proceeds to step S10. In step S10, the windup motor 4 is stopped by the motor control circuit 18. The photographic frame to be positioned will have been positioned facing opposite the opening 26 when the photointerrupter 10 detects the perforation. In step S11, the illuminating light source 11 is turned on by the illumination control circuit 19. The illuminating light from the light source 11 illuminates the film 2 from the rear via the diffusion plate 12 and the light that has passed through the film 2 is picked up on the CCD 14 via the image pickup lens 13.

In step S12, an initial value of the zoom magnification at which an image on the film is picked up by the CCD 14 is set. The details are shown in the flowchart in FIG. 10.

In step S12-1, based upon the magnetic information read in step S8, the aspect ratio for printing (print size) is determined. There are three print sizes, i.e., the normal size with an aspect ratio of 2:3, the wide size with an aspect ratio of 9 : 16 and the panorama size with an aspect ratio of 1:3. If the print size is determined to be normal, the operation proceeds to step S12-2, in which a decision is made as to whether the wide television or the regular television has been set with the TV-type switch, which is one of the switches constituting the operating switch group 23. If the regular television has been set, the operation proceeds to step S12-3, in which a first zoom magnification is set. If, on the other hand, it is decided in step S12-1 that the print size is other than the normal size, or if it is decided in step S12-2 that the wide television has been set, the operation proceeds to step S12-4, in which a second zoom magnification, which is smaller than the first zoom magnification, is set.

In this context, the smaller zoom magnification means that the angle of view of the image projected on the CCD 14 is wide and, consequently, on a TV screen, a wider range can be displayed when the second zoom magnification is set compared to when the first zoom magnification is set.

Thus, in this embodiment, the zoom magnification is set larger when the print size is normal and the television being used is a regular television compared to that in other cases. The reason for this is to be explained later.

In step S13, the AF/zoom control circuit 17 is operated to zoom drive the image pickup lens 13 in the direction of the optical axis so that the zoom magnification is set at the initial value set in step S12. In step S14, based upon the magnetic information read in step S8, the aspect ratio for printing (print size) is determined. If the print size for the positioned photographic frame is normal, the operation proceeds to step S15, if it is wide, the operation proceeds to step S16 and if it is panorama, the operation proceeds to step S17. In steps S15–S17, a decision is made as to whether wide television or regular television has been set at the TV-type switch, which is one of the switches constituting the operating switch group 23. In steps S18–S23, in correspondence to the outcome of the decision making performed in steps S14–S17, the settings at the mask circuit 161 are changed as follows in order to form a screen image with a specific aspect ratio.

Figure 11A:
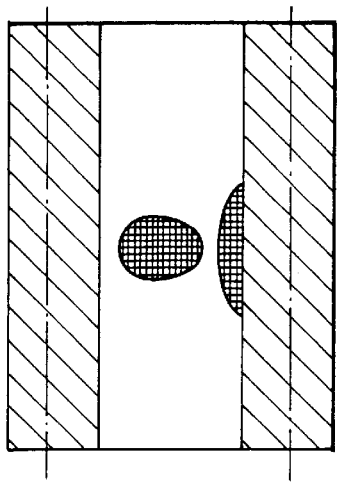
FIGS. 11A–11F illustrate aspect ratios of screen images displayed on a TV screen, showing display states when a wide television is used.
Figure 11D:
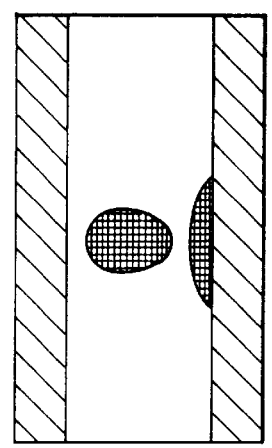

(1) When the print size is normal and the TV type is wide:

In this case, the operation proceeds to step S18, in which the upper and lower portions of the screen image (screen image in the image area IA) with an aspect ratio of 3:4 input from the image pickup circuit 15, are masked to achieve a screen image with an aspect ratio of 9:16. Then, the screen image that has been masked to achieve the aspect ratio of 9:16 is further masked in the horizontal direction to achieve an aspect ratio of 2:3 for printing in the normal size. As a result, a screen image that is masked in both the vertical and horizontal directions is achieved (see FIG. 11A). Since a wide television displays a television screen image with an aspect ratio of 3:4 by cutting off its upper and lower portions, the screen image that is displayed on the TV screen has its left and right portions masked as shown in FIG. 11D.

Figure 12C:
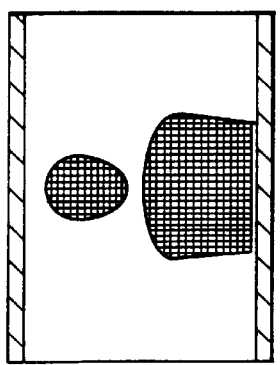
FIGS. 12A–12C, which are similar to FIG. 9 show display states when a regular television is used.
Figure 12B:
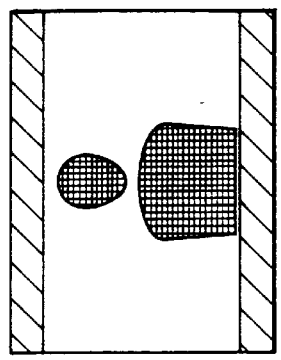
Figure 12A:
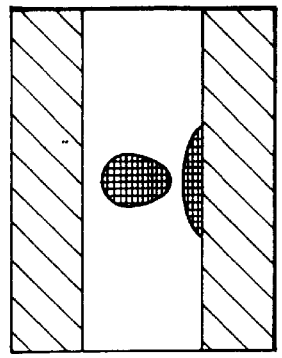

(2) When the print size is normal and the TV type is regular:

In this case, the operation proceeds to step S19, in which the upper and lower portions of the screen image input from the image pickup circuit 15 are masked to achieve a screen image with an aspect ratio of 2:3. On the screen of a regular television, a screen image with its upper and lower portions masked as shown in FIG. 12A, is displayed.

Since, when the print size is normal and the TV type is regular, as in (2) above, the aspect ratio of the print is laterally elongated compared to the aspect ratio of the TV screen, a screen image with an aspect ratio of 2:3 can be achieved by masking only the upper and lower portions of the screen image with an aspect ratio of 3:4. In contrast, when the print size is normal and the TV type is wide, as in (1), the aspect ratio of the print is longitudinally elongated compared to the aspect ratio of the TV screen and the upper and lower portions of the screen image with an aspect ratio of 3:4 are cut off to display an image with an aspect ratio of 9:16 on a wide television. Thus, as explained above, the upper and lower portions of a screen image with an aspect ratio of 3:4 must first be masked to achieve an aspect ratio of 9:16 and then the left and right portions of the screen image with an aspect ratio of 9:16 are masked to create a screen image with an aspect ratio of 2:3. Because of this, if the same zoom magnification is used by the image pickup lens in (1) and (2), even with the same screen image with an aspect ratio of 2:3, the screen image range will be different on a wide television and on a regular television. In this embodiment, since the zoom magnification in case (1) is smaller than the zoom magnification in case (2), as explained earlier, it is possible to display the screen image over the same range in (1) and (2). In other words, the first magnification and the second magnification described earlier are set to ensure that a screen image over the same range can be achieved in (1) and (2).

Figure 11B:
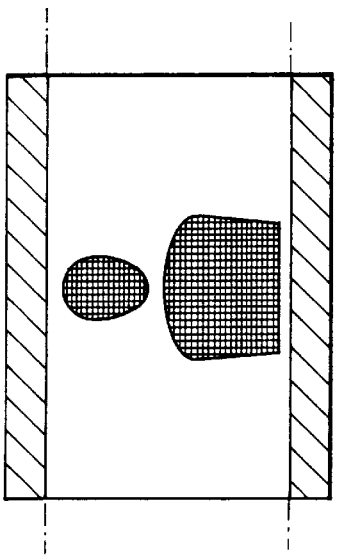
Figure 11E:
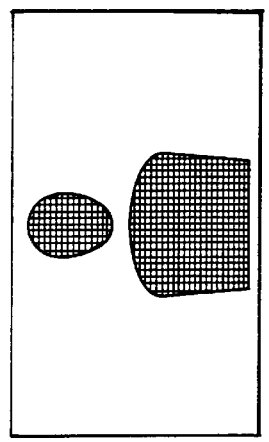

(3) When the print size is wide and the TV type is wide:

In this case, the operation proceeds to step S20, in which the upper and lower portions of a screen image input from the image pickup circuit 15 are masked to achieve a screen image with an aspect ratio of 9:16. As a result, the screen image with its upper and lower portions masked, as shown in FIG. 11B, is achieved. On the screen of a wide television, this screen image will be displayed as shown in FIG. 11E.

(4) When the print size is wide and the TV type is regular:

In this case, the operation proceeds to step S21, in which the upper and lower portions of a screen image input from the image pickup circuit 15 are masked to achieve a screen image with an aspect ratio of 9:16. On the screen of a regular television, this will be displayed as a screen image with its upper and lower portions masked as shown in FIG. 12B.

Figure 11C:
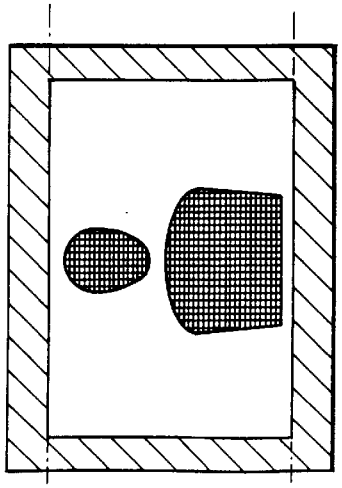
Figure 11F:
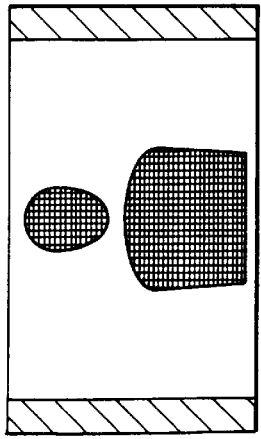

(5) When the print size is panorama and the TV type is wide:

In this case, the operation proceeds to step S22, in which the upper and lower portions of a screen image input from the image pickup circuit 15 are masked to achieve a screen image with an aspect ratio of 1:3. Consequently, a screen image with its upper and lower portions masked as shown in FIG. 11C is achieved. On the screen of a wide television, this will be displayed as shown in FIG. 11F.

(6) When the print size is panorama and the TV type is regular:

In this case, the operation proceeds to step S23, in which the upper and lower portions of the screen image input from the image pickup circuit 15 are masked to achieve a screen image with an aspect ratio of 1:3. On the screen of a regular television, this will be displayed as a screen image with its upper and lower portions masked as shown in FIG. 12C.

In cases (3)–(6), the aspect ratio of the print is laterally elongated compared to the aspect ratio of the TV screen as in (2), and a screen image with a specific aspect ratio is created by masking only the upper and lower portions of the screen image. Consequently, no problem will arise with the second zoom magnification in any of the cases.

Note that the processing in (1)–(6) above only changes the settings at the mask circuit 161 and, at this point, no screen image signal has been input to the mask circuit 161.

After steps S18–S23, the operation proceeds to step S24, in which the information related to the relevant photographic frame (the photographic frame positioned at the opening 26) is read from the magnetic information on the film recorded in the memory 24 and it is then stored in the memory 24. In step S25, information that is to be displayed in characters on the TV screen is selected from the information related to this particular photographic frame thus stored in memory. In other words, the information related to a photographic frame is constituted with a plurality of types of information and since displaying all the different types of information will crowd the screen, a few types of information, which may be set in advance at the camera, are selected from the plurality of types of information that have been read, to be displayed on the screen. For instance, if the photographing year, month, day, hour, minute and second have been recorded, only the year, month and day may be selected and, in that case, the hour, minute and second will not be selected. In addition, since the print size has been already set through the processing performed in steps S18–S23 and it is, therefore, not necessary to display it with characters, it will not be selected. The superimpose circuit 162, upon receiving a command from the CPU 22, generates a signal for displaying the selected information as character strings on the TV screen and adds this signal to the output signal from the mask circuit 161.

In step S26, the image pickup circuit 15 and the CCD 14 are operated to perform an image pickup operation. An output signal from the CCD 14 is converted to a video signal at the image pickup circuit 15 and is then converted to a display screen image signal at the screen image control circuit 16. At this time, as explained in reference to steps S18–S23 earlier, the mask circuit 161 sets the aspect ratio of the screen image and the superimpose circuit 162 adds a signal representing a character string. The display screen image signal generated at the screen image control circuit 16 is input to the television (not shown) via the video signal output terminal 25 to be visually displayed on the TV screen. In other words, a photographic image of the photographic frame that is currently positioned is displayed as a positive screen image on the TV screen and the information related to this particular photographic image is displayed superimposed on it.

In step S27, a decision is made in regard to the state of the print command switch, which is one of the switches in the operating switch group 23, and if it is decided that the print command switch has been switched from off to on, the operation proceeds to step S28. In step S28, a decision is made as to whether or not a print command has already been issued for the relevant photographic frame (the photographic image currently displayed on the TV screen) based upon the contents of the memory 24, and if a negative decision is made, the operation proceeds to step S30. In step S30, information indicating that a print command has been issued for the relevant photographic frame is stored in the memory 24 before the operation proceeds to step S31. If, on the other hand, an affirmative decision is made in step S28, i.e., if a print command has already been issued, the information indicating that a print command has been issued is deleted from the memory 24 in step S29 before the operation proceeds to step S31. Note that if a negative decision is made in step S27, the operation skips steps S28–S30 and proceeds directly to step S31.

In step S31, the contents of the memory 24 are read to make a decision as to whether or not a print command has been issued for the relevant photographic frame. If a print command has been issued, the operation proceeds to step S32, in which a superimpose circuit 132 is caused to operate to display a print command mark (not shown) on the TV screen. If, on the other hand, a print command has not been issued, the operation proceeds to step S33, in which a print command mark is cleared from the TV screen.

In step S34, a decision is made in regard to the state of the TV-type switch, which is one of the switches constituting the operating switch group 23, and if wide television has been set, the operation proceeds to step S35, whereas, if regular television has been set, the operation proceeds to step S36. In steps S35 and S36, the print size is determined based upon the magnetic information that has been read and, in correspondence to the outcome of this decision making, the following processing is performed.

Figure 13B:
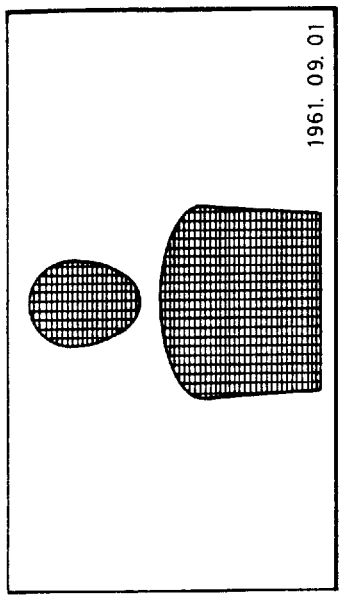
FIGS. 13A–13C show various display samples when information is displayed on the screen.
Figure 13A:
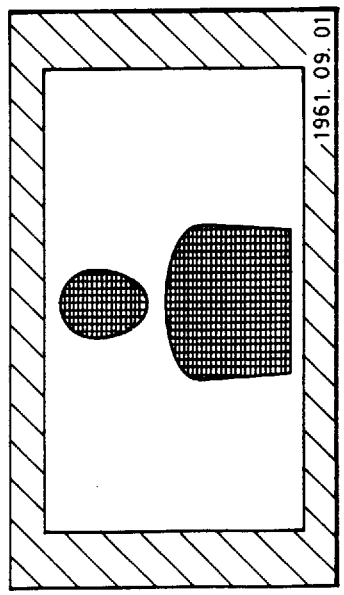

When the print size is wide or normal and the TV type is wide, a decision is made in step S37 as to whether the off-image display switch, which is one of the switches constituting the operating switch group 23, is on or off. If it is on, the operation proceeds to step S38, in which the screen image is photographed reduced by zoom driving the image pickup lens 13, as shown in FIG. 13A, for instance, and the character display position in the vertical direction is set in the lower masked area on the screen. If the off-image display switch is off, the operation proceeds to step S39, in which the character display position in the vertical direction is set within the screen, as shown in FIG. 13B, for instance.

Figure 13C:
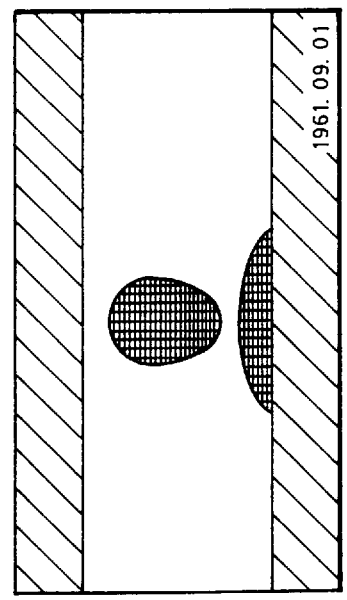

When the print size is panorama and the TV type is wide, the operation proceeds to step S40, in which the character display position in the vertical direction is set in the lower masked area on the screen, as shown in FIG. 13C, for instance.

Figure 14B:
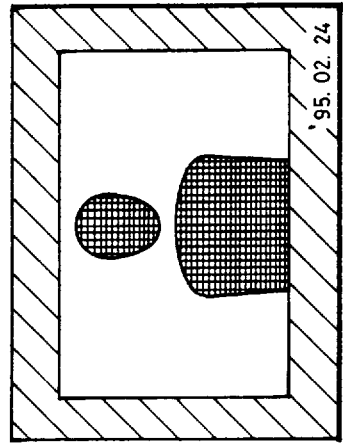
FIGS. 14A–14D are similar to FIGS. 13A–13C.

When the print size is normal and the TV type is regular, a decision is made in step S41 as to whether the off-image display switch is on or off. If it is on, the operation proceeds to step S42, in which the screen image is photographed reduced, as shown in FIG. 14B, for instance, and the character display position in the vertical direction is set in the lower masked area in the screen. If the off-image display switch is off, the operation proceeds to step S43, in which the character display position in the vertical direction is set within the screen, as shown in FIG. 14A, for instance.

Figure 14D:
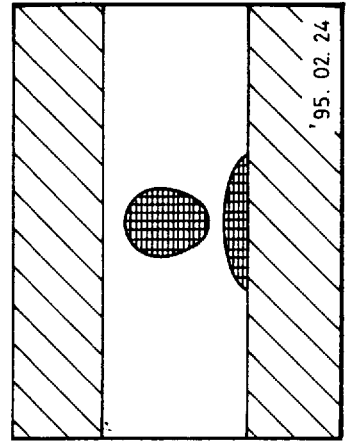
Figure 14A:
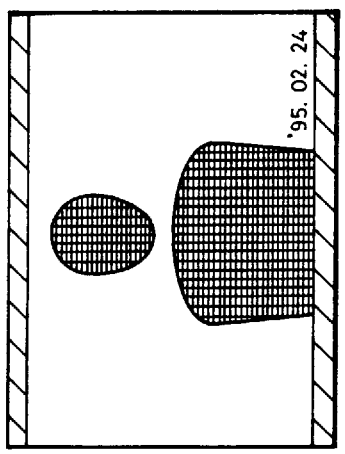
Figure 14C:
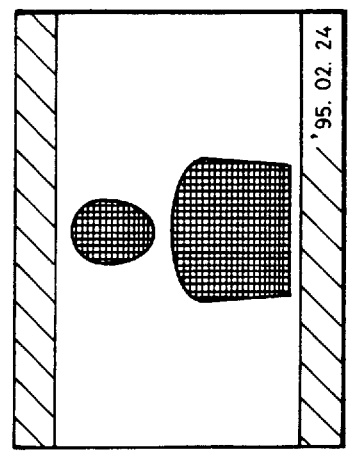

When the print size is wide or panorama and the TV type is regular, the operation proceeds to step S44 regardless of whether the off-image display switch is on or off and the character display position in the vertical direction is set in the lower masked area of the screen, as shown in FIG. 14C or FIG. 14D, for instance.

Figure 15C:
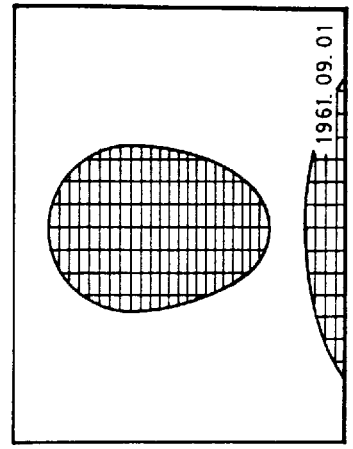
FIGS. 15A–15C are similar to FIGS. 13A–13C.
Figure 15A:
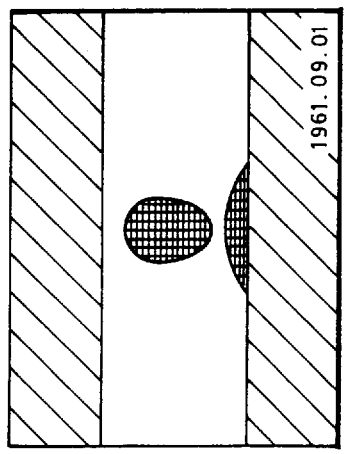
Figure 15B:
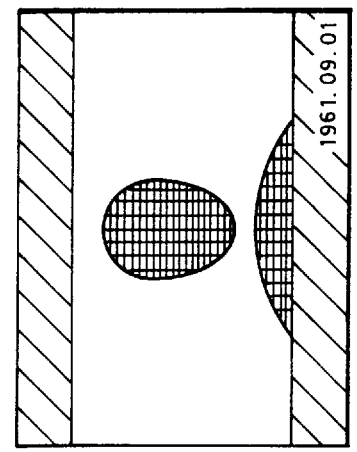

In step S45, a decision is made as to whether or not the zoom switch, which is one of the switches constituting the operating switch group 23, has been operated, and if it has been operated, the image pickup lens 13 is zoomed in step S46, to enlarge or reduce the film image. In step S47, the mask width inside the screen is reset. In other words, when the film image is enlarged or reduced during the zooming process performed in step S45, the magnification of the screen image changes and the initial mask width in panorama, for instance, illustrated in FIG. 15A, must be changed when enlargement is performed to prevent the upper and lower portions of the original screen image from being cut off. Thus, by reducing the mask width at the top and bottom, as shown in FIG. 15B, it is ensured that the upper and lower portions of the screen image will not be cut off. In other words, a screen image over the same range as the original screen image is displayed in the vertical direction. In contrast, when reduction is performed, the mask width is increased to ensure that no unnecessary portions will be displayed on the screen.

In step S48, a decision is made as to whether or not the mask width on the screen has been reduced to the extent that character display is not possible after the enlargement performed through zooming control in step S46. If a negative decision is made in step S48, the operation proceeds to step S50, whereas, if an affirmative decision is made, the operation proceeds to step S49. In step S49, the off-image display switch, which is one of the switches constituting the operating switch group 23, is switched to set the character display position in the vertical direction to a position within the screen image, as shown in FIG. 15C, for instance, before the operation proceeds to step S50.

In step S50, a decision is made in regard to the television type and in step S51, a decision is made in regard to the print size. Depending upon the results of the decision making, the processing in either step S52 or step S53 is performed. To be more specific, when the print size is normal and the TV type is wide, the operation proceeds to step S52, in which the character display position in the horizontal direction is set toward the right center. In other words, when the print size is normal and the TV type is wide, masked portions are formed at the left and right sides of the screen as shown in FIG. 11D, and in order to ensure that no characters are displayed in these masked areas, the character display position is moved toward the center. Since no masked areas are formed on the left and right sides of the screen otherwise, the character display position in the horizontal direction is set at the right end in step S53. In step S54, character display is performed at the display position in the vertical and the horizontal directions set in the manner described above.

In step S55, a decision is made as to whether or not the windup switch, which is one of the switches constituting the operating switch group 23, is on. If it is determined to be off, the operation proceeds to step S57, in which a decision is made as to whether or not the rewind switch, which is one of the switches constituting the operating switch group 23, is on. If the rewind switch is determined to be off, the operation returns to step S57 to repeat the processing described above. When the windup switch is turned on, the operation proceeds to step S56, in which a decision is made as to whether or not the currently positioned photographic frame is the last frame. If it is not the last frame, the operation returns to step S56 to repeat the processing described above, whereas, if it is determined to be the last frame, the operation proceeds to step S58. When the rewind switch is turned on, the operation proceeds to step S58 as well.

In step S58, the illuminating light source 11 is turned off via the illumination control circuit 19. In step S59, the image pickup circuit 15 is stopped to end the image pickup operation. In step S60, the rewind motor 5 is caused to rotate in the direction of rewind via the motor control circuit 18 to start rewinding the film 2.

In step S61, the contents of the memory 24 are read out to make a decision as to whether or not a print command has been issued for the relevant photographic frame (the frame currently being rewound). If a print command has been issued, the operation proceeds to step S62, in which the magnetic head 7 is driven via the magnetic record circuit 21 to record print information in the magnetic recording area corresponding to the relevant photographic frame. After that, the operation proceeds to step S63.

If it is decided in step S61 that a print command has not been issued, the operation skips step S62 and proceeds to step S63. In step S63, the operation waits for the rewind of one frame to be completed, and upon completion of rewind of one frame, the driving of the magnetic head 7 is stopped before the operation proceeds to step S64. In step S64, the output from the film encoder 8 is checked to make a decision as to whether or not rewinding of all the frames has been completed. If the film encoder 8 is rotating, it is decided that the rewinding is not completed yet and the operation returns to step S61 to repeat the processing described above. If the encoder 8 is not rotating, it is decided that the rewinding has been completed and the operation proceeds to step S65, in which the rotation of the rewind motor 5 is stopped via the motor control circuit 18. After this, the processing is ended.

Note that in this embodiment, since information is displayed in a non-screen image area when the non-screen image area within the monitor screen where no screen image of the photographic image is displayed is larger than a specific size and the display position of the information is moved to a specific location within the area where the screen image is displayed when the non-screen image area becomes smaller than the specific size due to an increase in the magnification, the information is normally displayed in the non-screen image area and does not encroach upon the screen image. At the same time, even when the non-screen image area becomes reduced, the information is not cleared from the screen, making it possible to see the information at all times.

Note that while an example in which the apparatus according to the present invention is connected to a separate television set, and a screen image is displayed using the screen of the television has been presented above, the apparatus itself, for instance, may have a built in monitor. In addition, while the TV-type switch specifies the TV type (information related to the aspect ratio of the screen) in the example, the aspect ratio of the screen may be determined by reading information from the connected television. In addition, while the print size (information related to the aspect ratio of a print) is read from the magnetic recording area on the film in the example, the present invention may be structured so that this information is specified by a switch. Moreover, while, in the example, the image magnification is changed by zoom driving the image pickup lens 13, the magnification may be changed through a digital zoom in the image processing. Furthermore, the information to be displayed is not restricted to date information and the information may be, for example, the exposure value or something else.

We claim:

1. A film image processing apparatus comprising:
   an image pickup device that picks up a photographic image formed on developed film;
   a screen image signal output circuit, which is electrically connected with said image pickup device, that outputs a screen image signal so that said image that has been picked up is displayed as a screen image on a monitor screen;
   a magnification device, which is electrically connected with said screen image signal output circuit, that changes magnification of said screen image to be displayed on said monitor screen;
   a print information input device that inputs information related to an aspect ratio of a print with which said photographic image is printed; and
   a control circuit, which is electrically connected with said magnification changing device and said print information input device, that controls said magnification changing device to change said magnification of said screen image of said photographic image in correspondence to said aspect ratio of said print that has been input.

2. A film image processing apparatus according to claim 1, wherein:
   said control circuit controls said magnification changing device so that when said aspect ratio of said print is longitudinally elongated compared to an aspect ratio of said monitor screen, said magnification of said screen image is reduced compared to magnification otherwise.

3. A film image processing apparatus according to claim 1, wherein:
   said print information input device is constituted with a read device that reads information related to said aspect ratio of said print from a recording area provided on said film.

4. A film image processing apparatus according to claim 2, wherein:
   said print information input device is constituted with a read device that reads information related to said aspect ratio of said print from a recording area provided on said film.

5. A film image processing apparatus according to claim 1, wherein:
   said control circuit controls said magnification changing device so that when said aspect ratio of said print input from said print information input device is normal, magnification of a screen image of said photographic image is changed in correspondence to an aspect ratio of said monitor screen.

6. A film image processing apparatus according to claim 1, wherein:
   said control circuit controls said magnification changing device so that when said aspect ratio of said print input from said print information input device is wide, magnification of a screen image of said photographic image is changed in correspondence to an aspect ratio of said monitor screen.

7. A film image processing apparatus according to claim 1, wherein:
   said control circuit controls said magnification changing device so that when said aspect ratio of said print input from said print information input device is panorama, magnification of a screen image of said photographic image is changed in correspondence to said aspect ratio of said monitor screen.

8. A film image processing apparatus comprising:
   an image pickup device that picks up a photographic image formed on developed film;
   a screen image signal output circuit, which is electrically connected with said image pickup device, that outputs a screen image signal so that said image that has been picked up is displayed as a screen image on a monitor screen;
   a magnification changing device, which is electrically connected with said screen image signal output circuit, that changes magnification of said screen image to be displayed on said monitor screen;
   a print information input device that inputs information related to an aspect ratio of a print with which said photographic image is printed;
   a monitor information input device that inputs information related to an aspect ratio of said monitor screen; and
   a control circuit, which is electrically connected with said magnification changing device, said print information input device and said monitor information input device, that controls said magnification changing device to change magnification of a screen image of said photographic image in correspondence to said aspect ratio of said print and said aspect ratio of said monitor screen that have been input.

9. A film image processing apparatus according to claim 8, wherein:
   said control circuit controls said magnification changing device to ensure that when said aspect ratio of said print is longitudinally elongated compared to said aspect ratio of said monitor screen, said magnification of said screen image is reduced compared to magnification otherwise.

10. A film image processing apparatus according to claim 8, wherein:
said print information input device is constituted with a read device that reads information related to said aspect ratio of said print from a recording area provided on said film.

11. A film image processing apparatus comprising:
an image pickup device that picks up a photographic image formed on developed film;
a screen image signal output circuit, which is electrically connected with said image pickup device, that outputs a screen image signal so that said image that has been picked up is displayed as a screen image on a monitor screen;
a magnification changing device, which is electrically connected with said screen image signal output circuit, that changes magnification of a screen image signal to be displayed on said monitor screen;
a monitor information input device that inputs information related to an aspect ratio of said monitor screen; and
a control circuit, which is electrically connected with said magnification changing device and said monitor information input device, that controls said magnification changing device to change magnification of said screen image in correspondence to said aspect ratio of said monitor screen that has been input.

12. A film image processing apparatus according to claim 11, wherein:
said control circuit controls said magnification changing device to ensure that when said aspect ratio of said monitor screen is laterally elongated compared to an aspect ratio of a print that has been input, said magnification of said screen image is reduced compared to magnification otherwise.

13. A film image processing apparatus according to claim 11, wherein:
said monitor information input device is constituted with an operating member by which said information related to said aspect ratio of said monitor screen is manually inputted.

14. A film image processing apparatus according to claim 12, wherein:
said monitor information input device is constituted with an operating member by which information related to said aspect ratio of said monitor screen is manually inputted.

15. A film image processing apparatus according to claim 1, wherein:
said magnification changing device is constituted with a zooming optical system disposed between said film and said image pickup device, and a zoom drive mechanism that changes said magnification of said screen image by driving said zooming optical system in a direction of an optical axis.

16. A film image processing apparatus according to claim 11, wherein:
said magnification changing device is constituted with a zooming optical system disposed between said film and said image pickup device, and a zoom drive mechanism that changes said magnification of said screen image by driving said zooming optical system in a direction of an optical axis.

17. A film image processing apparatus comprising:
an image pickup device that picks up a photographic image formed on developed film;
a screen image signal output circuit, which is electrically connected with said image pickup device, that outputs a screen image signal so that said image that has been picked up is displayed as a screen image on a monitor screen;
a mask circuit, which is electrically connected with said screen image signal output circuit, that processes said screen image signal so that said screen image of said photographic image is displayed with a portion masked;
a print information input device that inputs information related to an aspect ratio of a print with which said photographic image is printed and
a control circuit, which is electrically connected with said mask circuit and said print information input device, that controls said mask circuit to ensure that a masked area of said screen image is changed in correspondence to said aspect ratio of said print that has been input.

18. A film image processing apparatus comprising:
an image pickup device that picks up a photographic image formed on developed film;
a screen image signal output circuit, which is electrically connected with said image pickup device, that outputs a screen image signal so that said image that has been picked up is displayed as a screen image on a monitor screen;
a mask circuit, which is electrically connected with said screen image signal output circuit, that processes said screen image signal so that said screen image of said photographic image is displayed with a portion masked;
a monitor information input device that inputs information related to an aspect ratio of said monitor screen; and
a control circuit, which is electrically connected with said mask circuit and said monitor information input device, that controls said mask circuit to ensure that a masked area of said screen image is changed in correspondence to said aspect ratio of said monitor screen that has been input.

19. A film image processing apparatus comprising:
an image pickup device that picks up a photographic image formed on developed film;
a screen image signal output circuit, which is electrically connected with said image pickup device, that outputs a screen image signal so that said image that has been picked up is displayed as a screen image on a monitor screen;
a magnification changing device, which is electrically connected with said screen image signal output circuit, that changes magnification of said screen image to be displayed on said monitor screen;
a control circuit, which is electrically connected with said magnification changing device, that controls said magnification changing device to change said magnification of said screen image in response to a magnification change command;
a command device, which is electrically connected with said screen image signal output circuit, that outputs a screen image change command to display a screen image of a photographic image belonging to a frame other than a frame whose screen image is currently being displayed on said monitor screen; and an initial setting circuit, which is electrically connected with said control circuit and said command device, that outputs a magnification change command for resetting said magnification of said screen image to an initial magnification set when an image on said film was picked up to said control circuit in response to said screen image change command.

20. A film image processing apparatus comprising:

an image pickup device that picks up a photographic image formed on developed film;

a screen image signal output circuit, which is electrically connected with said image pickup device, that outputs a screen image signal so that said image that has been picked up is displayed as a screen image on a monitor screen;

a magnification changing device, which is electrically connected with said screen image signal output circuit, that changes magnification of said screen image to be displayed on said monitor screen; and a control circuit, which is electrically connected with said magnification changing device, that masks a portion of said screen image signal to ensure that a screen image of said photographic frame is displayed in a specific screen image area within said monitor screen, and when said magnification of said screen image is changed by said magnification changing device subsequently, changes a size of said masked area in such a manner that said screen image area is increased or reduced in correspondence to said change in said magnification.

21. A film image processing apparatus comprising:

an image pickup device that picks up a photographic image formed on developed film;

a screen image signal output circuit, which is electrically connected with said image pickup device, that outputs a screen image signal so that said image that has been picked up is displayed as a screen image on a monitor screen;

a display signal output circuit that outputs a display signal to display information related to a photographic image for which said screen image signal is currently being output on said monitor screen;

an information input device that inputs information related to a ratio of space occupied by said screen image within said monitor screen; and a control circuit, which is electrically connected with said display signal output circuit and said information input device, that controls said display signal output circuit to change a display position of said information to be displayed in correspondence to information input by said information input device.

22. A film image processing apparatus according to claim 21, wherein:

said information input device is constituted with a print aspect ratio input device that inputs information related to an aspect ratio of a print with which said photographic image is printed.

23. A film image processing apparatus according to claim 22, wherein:

said control circuit controls said display signal output circuit in such a manner that said information is displayed either inside or outside said screen image of said photographic image depending upon said aspect ratio of said print.

24. A film image processing apparatus according to claim 22, wherein:

said print aspect ratio input device is constituted with a read device that reads information related to said aspect ratio of said print from a recording area provided on said film.

25. A film image processing apparatus according to claim 23, wherein:

said print aspect ratio input device is constituted with a read device that reads information related to said aspect ratio of said print from a recording area provided on said film.

26. A film image processing apparatus according to claim 21, wherein:

said information input device is constituted with a monitor aspect ratio input device that inputs information related to an aspect ratio of said monitor screen.

27. A film image processing apparatus according to claim 26, wherein:

said control circuit controls said display signal output circuit in such a manner that said information is displayed either inside or outside said screen image of said photographic image depending upon said aspect ratio of said monitor screen.

28. A film image processing apparatus according to claim 26, wherein:

said monitor aspect ratio input device is constituted with an operating member by which information related to said aspect ratio of said monitor screen is manually inputted.

29. A film image processing apparatus according to claim 27, wherein:

said monitor aspect ratio input device is constituted with an operating member by which information related to said aspect ratio of said monitor screen is manually inputted.

30. A film image processing apparatus according to claim 21, further comprising:

a control circuit, which is electrically connected with said display signal output circuit and said information input device that controls said display signal output circuit to ensure that when a non-screen image area where a screen image of said photographic image is not displayed within said monitor screen is as large as or larger than a specific size, said information is displayed in said non-screen image area and that when said non-screen image area is smaller than said specific size, a display position of said information is moved inside an area where said screen image is displayed.

31. A film image processing apparatus according to claim 21, wherein;

said information input device inputs information related to a masked range of a mask masking inside said monitor screen.

32. A film image processing apparatus according to claim 21, wherein;

said information input device is provided with:

a magnification changing device, which is electrically connected with said screen image signal output circuit, that changes a magnification of a screen image being displayed on said monitor screen; and a ratio changing device, which is electrically connected with said magnification changing device, that changes said ratio in correspondence to said magnification.

33. A film image processing apparatus according to claim 32, further comprising:

a mask circuit, which is electrically connected with said screen image signal output circuit that masks said monitor screen, wherein:

said mask circuit determines a masked range within said monitor screen in correspondence to said ratio.

34. A film image processing apparatus according to claim 32, wherein:

said magnification changing device is constituted with a zooming optical system disposed between said film and said image pickup device, and a zoom drive mechanism that changes said magnification of said screen image by driving said zooming optical system in a direction of an optical axis.

35. A film image processing apparatus according to claim 22, wherein:

said control circuit controls said magnification changing device so that when said aspect ratio of said print input by said print aspect ratio input device is normal, said magnification of said screen image of said photographic image is changed in correspondence to an aspect ratio of said monitor screen.

36. A film image processing apparatus according to claim 22, wherein;

said control circuit controls said magnification changing device so that when said aspect ratio of said print input by said print aspect ratio input device is wide, said magnification of said screen image of said photographic image is changed in correspondence to an aspect ratio of said monitor screen.

37. A film image processing apparatus according to claim 22, wherein;

said control circuit controls said magnification changing device so that when said aspect ratio of said print input by said print aspect ratio input device is panorama, said magnification of said screen image of said photographic image is changed in correspondence to an aspect ratio of said monitor screen.

* * * * *